United States Patent
Basner et al.

(10) Patent No.: US 8,042,159 B2
(45) Date of Patent: Oct. 18, 2011

(54) WEBSITE LOG IN SYSTEM WITH USER FRIENDLY COMBINATION LOCK

(75) Inventors: Charles M. Basner, Clinton Township, NJ (US); Kenneth P. Glynn, Flemington, NJ (US)

(73) Assignee: GlynnTech, Inc., Flemington, NJ (US)

( * ) Notice: Subject to any disclaimer, the term of this patent is extended or adjusted under 35 U.S.C. 154(b) by 1171 days.

(21) Appl. No.: 11/724,481

(22) Filed: Mar. 15, 2007

(65) Prior Publication Data
US 2008/0229397 A1    Sep. 18, 2008

(51) Int. Cl.
*H04L 9/32* (2006.01)
(52) U.S. Cl. ............ 726/5; 726/4; 713/182; 713/183
(58) Field of Classification Search ............ 726/5, 4, 726/8; 713/182, 183, 168
See application file for complete search history.

(56) References Cited

U.S. PATENT DOCUMENTS

| | | | |
|---|---|---|---|
| 6,209,104 B1 | 3/2001 | Jalili | |
| 6,332,192 B1 | 12/2001 | Boroditsky et al. | |
| 6,934,860 B1 | 8/2005 | Goldstein | |
| 7,007,168 B2 | 2/2006 | Kubo et al. | |
| 7,059,516 B2 | 6/2006 | Matsuyama et al. | |
| 7,062,707 B1 | 6/2006 | Knauft et al. | |
| 7,073,055 B1 | 7/2006 | Freed et al. | |
| 7,073,067 B2 * | 7/2006 | Mizrah | 713/183 |
| 2001/0039618 A1 | 11/2001 | Azuma | |
| 2002/0002688 A1 * | 1/2002 | Gregg et al. | 713/202 |
| 2002/0029341 A1 | 3/2002 | Juels et al. | |
| 2002/0053035 A1 * | 5/2002 | Schutzer | 713/202 |
| 2002/0138728 A1 * | 9/2002 | Parfenov et al. | 713/170 |
| 2006/0206918 A1 * | 9/2006 | McLean | 726/2 |
| 2007/0130463 A1 * | 6/2007 | Law et al. | 713/168 |

OTHER PUBLICATIONS

Yee et al., Passpet: Convenient Password Management and Phishing Protection, Jul. 2006, ACM, SOUPS '06.*

* cited by examiner

*Primary Examiner* — Vivek Srivastava
*Assistant Examiner* — Samuel Ambaye
(74) *Attorney, Agent, or Firm* — Kenneth P. Glynn; Bradford W. Bondor; Deirdra M. Meagher (57) ABSTRACT

User friendly log in system for validation of user for entry into a website includes: (a) a plurality of user computers; (b) an internet; (c) a host server connected to the internet for connection to user computers; and (d) a website program hosted on the host server for a website that requires individual user security, for connecting each of the plurality of computers to the website available to the user computers, that includes an open log in field. The program has software for secured activity for receiving and recognizing a unique user identification from a user of a user computer to create a personal combination lock rule for a unique easy-to-remember user initialization input that includes a preset selection and operation of the intersection of a first randomly arranged challenge presentation and a second randomly arranged challenge presentation to obtain a selection solution.

24 Claims, 6 Drawing Sheets

| | | |
|---|---|---|
| 1. ROCKET | 13. BLOUSE | 25. HAMMER |
| 2. WALLET | 14. SOCKS | 26. TRAIN |
| 3. TIGER | 15. AUTO | 27. QUILL |
| 4. FENCE | 16. RADIO | 28. GLUE |
| 5. ZEBRA | 17. SLIPPER | 29. SHRIMP |
| 6. POINT | 18. UNICORN | 30. SWINE |
| 7. COMPASS | 19. ALLEY | 31. SNAIL |
| 8. FINGER | 20. TRENCH | 32. SCOOP |
| 9. TABLET | 21. FLOWER | 33. APPLE |
| 10. BREAD | 22. WATCH | 34. FISH |
| 11. TAPE | 23. APRON | 35. PAPER |
| 12. ROSE | 24. NAIL | 36. CARPET |

PREV. COMMUNICATED COMBO LOCK RULE:
$1^{ST}$ CHARACTER: SEVENTH WORD, FIRST LETTER
$2^{ND}$ CHARACTER: TWENTY FIFTH WORD, FOURTH LETTER
$3^{RD}$ CHARACTER: NINTH WORD, THIRD LETTER
　　SOLUTION IS:　　CMB

FIGURE 5

WEBSITE LOG IN SYSTEM WITH USER FRIENDLY COMBINATION LOCK

BACKGROUND OF INVENTION a. Field of Invention

The invention relates generally to log in systems for website access based on user friendly, easy to remember, steps. More specifically, the present invention system utilizes a dual intersecting challenge presentation to solve with a secret user rule to obtain web access. One of the challenge presentations is an array of alphanumeric characters and the other may be any set of differentiating items that intersect (overlap) the first. Thus, the second challenge presentation could be positional indicia, colors, shapes, things, etc.

b. Description of Related Art

The following patents are representative of prior art log in system methods:

U.S. Pat. No. 7,073,067 B2 to Len L. Mizrah describes an authentication server that provides a clue to a client indicating a random partial subset of a full pattern that characterizes a full digitized path on a frame of reference, and the client enters a data to fulfill an authentication factor suggested by the clue. The full pattern consists of an ordered set of data fields, which store parameters that specify the full digitized path on a reference grid for recognition. The server presents an instance of a graphical representation of the frame of reference, including an array of random indicators at data field coordinates in the frame of reference. The server accepts indicators from the array of indicators corresponding to coordinates along said digitized path identified by the random partial subset as input data to fulfill the authentication factor.

U.S. Pat. No. 7,073,055 to Micheal Freed et al. describes a system and methods for providing distributed and dynamic network services to remote access users. One of the methods includes providing a first certificate for requesting dynamic network services by a user network entity, and at least one second certificate for requesting static network services by the user network entity. According to one method, a user of the user network entity may generate a first message to request dynamic network services from a network service provider entity. For example, the first message may include the first certificate, a digital signature generated with a private encryption key associated with the certificate and list of network service that the user whishes to set up dynamically. In one embodiment, when the network service provider entity receives the first message, the network service provider entity verifies the authenticity of the first certificate and, if the first certificate is authentic, the network service provider entity configures a network connection between the user network entity and a network based on the network services requested by the user in the first message.

U.S. Pat. No. 7,059,516 B2 to Shinako Matsuyama et al. describes a person authentication system, a person authentication method, an information processing apparatus, and a program providing medium authenticate a person who uses an information apparatus in data communication. A person authentication certificate storing a template that includes person authentication data is used in the person authentication system. A person authentication execution entity checks the validity of the certificate on the basis of a certificate expiration date, a certificate usage number limit, or a template expiration date in person authentication processing on the basis of the certificate. The person authentication is executed by comparing the template with sampling information input by a user if the validity is confirmed. A person identification certificate authority updates the certificate or the template according to the request of the authenticated person.

U.S. Pat. No. 7,062,707 B1 to Christopher L. Knauft et al. describes a system and method of generating index information for electronic documents. The system includes a client and one or more information retrieval (IR) engines, such as a search engine, which are each in communication with each other via a network.

U.S. Pat. No. 7,007,168 B1 to Takeshi Kubo et al. describes an authentication apparatus, coordinates input from a coordinate detector via a plurality of discontinuous holes or openings, cutouts or marks provided on a member which is used to specify the coordinates are detected, and an authentication is made based on a comparison result of the detected coordinates and a plurality of registered coordinates.

U.S. Pat. No. 6,934,860 B1 to Richard J. Goldstien describes a system, method and articles of manufacture are provided for password protecting user access to a computer system. One or more images are displayed to a user. The user is then required to perform a sequence of actions involving the images. The performed sequence of actions is compared with a predefined sequence of actions. If the performed sequence of actions matches the predefined sequence of actions, user access is permitted.

U.S. Pat. No. 6,332,192 B1 to Marc D. Boroditsky et al. describes an invention that features a method for providing a user access to a secure application. The invention stores in an encrypted form the form the authentication information necessary to satisfy the authentication requirements of the secure application. When the user requests access to the secure application, the user is presented at his or her display with a request for authentication. The user must manipulate at least a portion of the symbol to respond properly to the authentication request. The user's manipulation(s) of the symbol(s) generate a CodeKey used to decrypt the encrypted stored authentication information into a result. After the result is created, it is provided to the secure application. If the result support's the secure application's authentication requirements (i.e., if the CodeKey has properly decrypted the encrypted stored authentication information), the user will be granted access to the secure application. The invention therefore provides a simple, secure and effective method for user to gain access to a multitude of secure applications without having to recall a series of complicated passwords.

U.S. Pat. No. 6,209,104 B1 to Reza Jalili describes an invention that is a secure data entry and visual authentication system that allows a user to securely input and communicate data, including passwords. The system includes a client subsystem, a server subsystem and a communication subsystem. Server subsystem generates a pseudorandomly arranged display image including a plurality of icons associated with data, and transmits said display images to client subsystem for display on a display device. A user consecutively selects at least one said icons corresponding to data desired to be input. Selected icon location information for those selected icons is communicated by client subsystem to server subsystem, which then compares that selected icon location information to icon location information and associated data stored in memory to ascertain the data input by the user.

United States Patent No. 2002/0053035 A1 to Daniel Schutzer describes a method and system for strong, convenient authentication of a web user makes use, for example, of a computing device, such as a user's personal computer (PC), coupled over a network, such as the Internet, to one or more servers, such as the host server of an authenticating authority, as well as one or more databases of the authenticating authority. The authentication process is broken into three phases, namely a registration phase, an enrollment phase, and a transaction authentication phase, with each phase being less intrusive and less secure than the preceding phase. In the registration phase, an authenticating authority registers the user based upon identification of the user using strong authentication technique and provides an authenticating token to the user, which can be used in the enrollment phase to enroll one or more user devices for the user. Thereafter, in the transaction authentication phase, the authenticating authority can authenticate the user for a transaction based on presentation by the user of a user password via the enrollment user device.

United States Patent No. 2002/0029341 A1 to Ari Juels et al. describes an enrollment and authentication of a user based on a sequence of discrete graphical choices is described. A graphical interface presents various images and memory cues that a user may associate with their original graphical choices. Enrollment may require the input to have a security parameter value that meets or exceeds a threshold. An acceptable sequence of graphical choices is converted to a sequence of values and mapped to a sequence of codewords. Both a hash of the sequence of codewords and a sequence of offsets are stored for use in authentication the user. An offset is the difference between a value and its corresponding codeword. Authentication requires the user to enter another sequence of discrete graphical choices that is approximately the same as original. The offsets are summed with the corresponding values before mapping to codewords. Authentication requires the sequence of codewords, or hash a thereof, to match.

United States Patent No. 2001/0039618 A1 to Tomihiko Azuma describes a user authentication method is provided which can provide high levels of security without a need for installing any special apparatus on a user over a network. A numeric value randomly produced by a service providing site is transmitted to a user terminal and a calculation result obtained by applying the numeric value to a numerical calculation method memorized by the user is returned back to the service providing site. The service providing the site judges whether the calculation result is right or wrong to perform a user authentication. There is no need for installing any additional device on the service providing site. Information used for the user authentication is not broken, thus avoiding abuse for the user authentication.

Notwithstanding the prior art, the present invention is neither taught nor rendered obvious thereby.

SUMMARY OF INVENTION

The present invention is a user friendly log in system for validation of a User's identity for entry into a website. It includes: (a) a plurality of User computers; (b) an internet and an internet connection among the plurality of User computers; (c) at least one Host server connected to the internet and available for connection to the plurality of User computers; and (d) a Website program for a specific Website that requires individual User security, for secured control for connecting each of the plurality of computers to the website, and connection portals available to each of the plurality of User computers, including an open log in field, the Website program being hosted on the at least one Host server. The Website and the Website program have means (sufficient hardware and software) to provide user friendly log in procedures, including software and hardware for: (i) secured means for receiving and recognizing a unique User identification from a User of a User computer to create a Personal Combination Lock Rule for a unique easy-to-remember user initialization input that includes a preset selection and operation of the intersection of a first randomly arranged challenge presentation and a second randomly arranged challenge presentation to obtain a selection solution; (ii) means for presenting a first randomly arranged challenge presentation including a plurality of sets of alphanumeric characters, each set having at least three characters, wherein the plurality of sets are arranged in a predetermined pattern and the alphanumeric characters are randomly arranged with each set; (iii) means for presenting a second randomly arranged challenge presentation at least partially overlapping the first randomly arranged challenge presentation to create plurality of intersections; (iv) inclusion of a successful selection solution pertaining to the User's Combination Lock Rule within the at least partial overlapping of the first randomly arranged challenge presentation and the second randomly arranged challenge presentation; (v) means for responding to a User selection and operation solution input from a User computer when the User input is inputted into the open log in field; (vi) means for acknowledging the selection operation solution input of the User and granting access to the website when the solution input is correct; and, (vii) means for denying access to the website when the User answers the solution input is incorrect.

In some preferred embodiments of the present invention user friendly log in system, the first randomly arranged challenge presentation is an array of sets of randomly arranged alphanumeric characters wherein the sets are arranged in rows and columns. However, they need not be arranged in such order, as they may be scattered into random groupings and/or different in count, such as contained within pictorial representations or silhouettes of objects, e.g. house, car, horse, plane and balloon. They may alternatively be columized or arranged in any pattern desired. In some preferred embodiments of the present invention user friendly log in system, the second randomly arranged challenge presentation is a plurality of visual or audio presentations selected from the group consisting of colors, a numbered sequence, a lettered sequence, shapes, and combinations thereof.

In some preferred embodiments of the present invention user friendly log in system, the Combination Lock Rule is given to the User during an initial set up session and is not presented by the host server at any subsequent log in time.

In some preferred embodiments of the present invention user friendly log in system, the Combination Lock Rule is to identify at least two alphanumeric characters based on at least two different combinations of at least one set from the first randomly arranged challenge presentation based on its intersection with the second randomly arranged challenge pattern, and then selection of at least one alphanumeric character from each selected set based on positions within the selected set to obtain a solution for solution input.

In some preferred embodiments of the present invention user friendly log in system, the Combination Lock Rule is to identify at least two alphanumeric characters based on at least two different combinations of at least one set from the first randomly arranged challenge presentation based on its intersection with the second randomly arranged challenge pattern, and then selection of at least one alphanumeric character from each selected set based on positions within the selected set to obtain a first solution for the solution input and subsequently operation on at least one character of the first solution by mathematical manipulation selected from addition and subtraction.

In some preferred embodiments of the present invention user friendly log in system, the second randomly arranged challenge presentation is a set of different colors, one each corresponding to each of the sets in said first randomly arranged challenge pattern. In some preferred embodiments of the present invention user friendly log in system, the colors are presented on a screen as color backgrounds highlighting each alphanumeric set.

In some preferred embodiments of the present invention user friendly log in system, the website program includes voice recognition features wherein a User may proceed through a log in by audio inputs. In some preferred embodiments of the present invention user friendly log in system, the website program further includes speak back features so that both inputs and outputs are audio.

In some preferred embodiments of the present invention user friendly log in system, the colors are spoken colors preceding spoken sets of alphanumeric characters.

In some preferred embodiments of the present invention user friendly log in system, the first and second randomly arranged challenge presentation may be different each time a website is opened. In some preferred embodiments of the present invention user friendly log in system, the first and second randomly arranged challenge presentation change on an open website after a predetermined time period has elapsed.

In some preferred embodiments of the present invention user friendly log in system, the website program further includes presentation of a plurality of different choices of Combination Lock Rules and each new user is afforded the opportunity to select a Combination Lock Rule at the initial sign up session. In the alternative, in some other preferred embodiments of the present invention user friendly log in system, the website program includes presentation of one combination lock rule to each new User at the initial sign up session. The program may sequentially select and assign Rules from an internal collection of Rules and some people will have the same Rule, but no one will know anyone else's Rule. In yet other preferred embodiments of the present invention user friendly log in system, the website program may store a significant plurality of different Combination Lock Rules and randomly assigns one to each new User.

In some preferred embodiments of the present invention user friendly log in system, the website program has a single Combination Lock Rule format, with many different Rules within that format, and only first randomly arranged challenge presentation alphanumeric position and second randomly arranged challenge presentation choice are changed in each of the many different Rules within the specific format.

In some preferred embodiments of the present invention user friendly log in system, the website program is a subprogram module of the website and may be programmable to permit a web programmer to customize at least one of the first and the second randomly arranged challenge presentation.

In some preferred embodiments of the present invention user friendly log in system, the website program has open fields for the second randomly arranged presentation and a website programmer is provided with a choice of second randomly arranged presentation symbols.

In some preferred embodiments of the present invention user friendly log in system, the alphanumeric characters include symbols of foreign languages.

The invention solves the problems and overcomes the drawbacks and deficiencies of prior art log in systems by providing easy to remember steps that make internet website access to secured sites user friendly.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings:

FIGS. 1 A and B illustrate a block diagram representation of a preferred embodiment of a log in system according to the present invention;

DETAILED DESCRIPTION OF THE EMBODIMENTS

The present invention involves a user friendly log in system for website (generally web page servers) access via opening of a combination lock to validate a User's identity. The confirmation is performed using a challenge-response dialog where the challenges are unpredictable, random series of alphanumeric characters overlapped with a second challenge presentation and the response is a short, easily calculated alphanumeric string which is rarely or never the same, and whose relationship to the challenge is not easily deducible.

The invention involves a database of Users that includes their unique User I.D. and their Personal Combo Lock Rule for calculating a response to a challenge, and a website security program that responds to requests for identification verification from User who has already registered, which in turn provides User access to the website when the correct solution to the challenge using the Personal Combo Lock Rule is made by the User.

The User I.D. is a unique identifier selected by each User specifically for use by the system of the present invention. The User needs to remember only this single User I.D. and simple PCL Rule (Personal Combo Lock Rule) in order to log on to a website with the present invention system.

The PCL Rule is a set of one or more steps that is applied to a set of alphanumeric and other challenge presentations, resulting in an alphanumeric response. The challenge presentations are supplied by website security program and are random. When the User's Rule is applied to those challenge presentations, it results in an alphanumeric string. Because the program has previously assigned or otherwise provided the User's Rule to the User, the program knows the Rule, the challenge presentation is in real time and the real time changing solution, corresponding to the User I.D. When the user inputs the correct challenge solution, access is granted and if not correct, access is denied.

The Problem

In general, World Wide Web users are members of many different organizations and use different URLs to access those organizations. For example, a User may be associated with a bank, an insurance company, a book club and an email host. Each of these organizations has a web page, and each one requires that the User "log in" before accessing that site's services.

"Logging in" generally consists of entering a previously determined User I.D. (sometimes an email address), along with a static Password (a combination of alphanumeric characters and symbols) specific to that site. The Password is usually obscured to prevent casual observers from stealing it, while the User I.D. is usually openly displayed.

This paradigm has become a standard on the World Wide Web, and each site is responsible for maintaining its own User I.D. and password. This creates several well-known problems, among which are:

- Users use different user I.D.s and/or passwords for different sites, and then cannot remember or have trouble keeping track of which User I.D. and password combination to use for each site.
- Users are often assigned difficult illogical passwords, such as "DINITUTO", impossible to remember and difficult to type.
- Users use the same User I.D. and/or password for different sites, compromising their security since anyone with access to that information on one of those sites can use it to access other sites. A single insecure site might provide a malicious entity with millions of potential User I.D. and password combinations.

There are many different solutions to these problems. Some people use programs that assign and remember different passwords for different sites. Others employ rules for modifying a base password in different ways for different sites (e.g., add "bank" to the end of a standard password when accessing web sites for banks, etc.). Still others maintain lists of sites and passwords that they refer to each time they visit a site. The majority of people, however, eschews these more complex solutions and simply uses the same static password for many different sites, where permitted, despite the lack of security this engenders. Alternatively, complex diverse passwords reduce risk, but make recall difficult.

The Solution

The present invention system is used to verify a User's identity. Any website can utilize the present invention system to perform this validation, and will reduce the risk of intervention while making the recall task easier.

The Personal Formula

A combination lock is a well-known device that requires a User to memorize a sequence of numbers and then apply that sequence in a predefined manner in order to open the lock. In other words, there is a first challenge presentation (numbers) and a second challenge presentation (direction and extent of rotation for each number). The PCL Rule similarly requires the User to choose and memorize a sequence of alphanumeric manipulations that are applied to two interfunctional challenge presentations to generate a result.

The manipulations that are chosen, memorized and performed mentally by the User can be trivial, yet still be undeterminable by an observer. As a simple example, say the random inputs are numbers from particular boxes, e.g. 1 7 3, and the manipulations are i) first subtract 1 from the third number to obtain a first combo number, ii) and then add 2 to the first number to obtain a second combo number. Using that manipulation, the correct response is 23. Anyone knowing rules i) and ii) can calculate the correct response instantly in their head. Yet an observer seeing both the inputs and the results would have no way of inferring the correct Rules. In the example, the Rule steps might just as easily have been i) add 1 to the first digit, ii) subtract 4 from the second digit—these steps give the same response, 23. However, given a different set of inputs, the inferred Rule steps would be highly unlikely to produce the same results as the correct solution.

Since the challenges supplied to the User are random, the correct response is always a different alphanumeric string. There is no password to steal. Even if a malicious person or program were to have access to all the inputs and all the correct responses for a particular User (itself an unlikely circumstance, except as noted in Malware below), they would still be unable to reconstruct the correct Rules and be able to respond correctly to another random challenge to that User.

Of course, that statement is true only if there is sufficient complexity in the inputs. If there are only 3 digits as inputs (as in the trivial example above), given enough inputs and responses it may be possible to deduce the correct Rules. But the present invention challenge presentations are far more complex, making it impossible to use previous answers to deduce the Rules. Hence, it involves the intervention or overlapping of the two challenge presentations coupled with the correct PCL Rule application for a given User I.D.

The invention might use six groups of 6 digit numbers as inputs. The groups might be colored in a way to make them instantly identifiable, say, Red, Blue, Yellow, Green, Black, and Orange. These groups can be arranged on the page in any order. A PCL Rule might include the Rule "add 1 to the $4^{th}$ digit of the Black group". This is a trivial calculation for someone who knows the Rule. Yet an observer of both challenge presentations (36 digits divided into six boxes) and the response would never be able to determine what Rule was used to calculate the response.

Note that no matter how complex the random challenge presentations are, the Rule need not ever be complex. Simple arithmetic is sufficient to create an unbreakable code. If a User chose or was given a 4 step formula that resulted in 4 digit numbers (from 0000 to 9999), a malicious attempt to break that code would have only a 1 in 10,000 chance of succeeding randomly. If the random inputs consisted of 6 groups of 6 digits, it is impossible to reconstruct the simple arithmetic steps used to generate the correct response, yet it is trivial for a person of average intelligence to mentally locate the appropriate group and digit, apply the appropriate Rule, and enter the resulting value.

Further examples of PCL Rules follow:
- Add or subtract a digit to or from a particular digit from a particular group (known as a pdpg). There are two options here if the resulting number is greater than 10: use the whole number (i.e., 6+7=13), or use just the ones digit (i.e., 6+7=13, use the 3). If the number is negative, just ignore the negative sign (i.e., 6−7=−1, use 1).
- Add two or more pdpgs together (choose nonconsecutive digits).
- Multiplication or division or some higher function on pdpgs.
- Pattern-based, for example, if a pdpg is 1-5, use another pdpg, e.g. the one below it.

Malware

Certain types of malicious programs can be installed surreptitiously on a computer and then monitor and record everything that occurs on it. Every keystroke, every image, every activity is recorded for later analysis. These types of programs, once installed, can instantly breach standard "static password" security measures. The malicious program can record every website, every User I.D. and every password that is entered on that computer. However, even those programs cannot breach the present invention system security. If the inputs are sufficiently complex, it is mathematically impossible to deduce the correct PCL Rule even given multiple examples of inputs and correct responses.

Human Behavior

Generally, the biggest security risk is not unsafe passwords or spyware programs—it is human behavior. People tend to act carelessly if it suits their immediate needs, even if such behavior puts them at long term risk. Thus, a husband might give his wife his password over the phone if he needs her to do a transaction for him, even though he knows the danger in giving his private password to anyone. That is why the present invention system allows Users to be "sloppy" when then want to be, without compromising the security of the entire system.

The first line of defense against sloppiness is the nature of the PCL Rule itself. As simple as it may be to remember, it is not so simple to tell someone else your formula and be sure they will get it right. Therefore, people have an incentive not to divulge their PCL Rule.

In some optional present invention systems, the second line of defense is to give people an alternative to giving out their password. Those alternatives are discussed below. They are all designed to allow people to do what they will end up doing anyway (giving up some security in the name of short term convenience), but without doing themselves any lasting damage.

Finally, the system will know when people choose to use these short term conveniences, and may choose not to honor the alternative password. For example, a bank may not permit access except by Users who prove they know the PCL Rule by using it, while a video rental system may allow access based on alternatives. Remember, these alternate log ins are still secure, but they are just slightly less secure than the full challenge-response system.

Limited Access Passwords

A user can have any number of Limited Access Passwords, which are single-use, static passwords that permit limited access (as defined by individual software criteria for a given present invention system offering this option). Should a particular system allow it, a Limited Access Password enables a User to temporarily grant access to someone else without giving away their PCL Rule. Often a person wants someone else to temporarily have access to some organization; in order to facilitate this desire without compromising a User's security, the User can give out a Limited Access Password specific to a particular limited access. For example, if a User belongs to an online movie rental club, and wants his/her spouse to log in to the account and select a movie, instead of giving the spouse the PCL Rule, the User gives them a Limited Access Password, which will only work one time (or perhaps for a limited length of time, maybe for one hour). After that, the User will have to create a new Limited Access Password or re-enable the old one.

Back Door Passwords

Each User may have a Back Door Password, which is a static password known only to that User. This password can be given as a response to a challenge at any time, and has the effect of bypassing the PLC Rule solution. However, this password can only be used for emergencies, and will initiate an emergency set of events. For example, it might cause the User to be called on the telephone to confirm their identity. In any case, it does not bypass the security restrictions, but only permits a User to engage in emergency actions with this system Decoy Rules A User can have an alternate Personal Rule that is only used for emergencies. This Decoy Rule can be used to generate a correct response to a challenge, just like the User's actual PCL Rule. However, using the Decoy Rule indicates to the system that something is wrong. For example, if someone is forced to tell another person their PCL Rule (in order to enable identity theft, for example), they can give the person their Decoy Rule instead. The system will note that the Decoy Rule is being used and may provide false information and initiate a theft protection scheme. Therefore, it may allow bank transactions to appear to go through, but invalidate them before they are committed. It may display financial information as requested, but modify that financial information so that it is not accurate. The exact nature of the protection scheme, when this option is included in the present invention, can vary among systems, but they will all recognize that the real User does not want the person using the Decoy Rule to have access rights to any User information.

A User can also use their Decoy Rule as a decoy. If the Decoy Rule is written down and someone tries to use it illicitly, their attempted theft will be "permitted" but not allowed to do any harm. Ideally, they won't even know they have used the "wrong" Rule until they are caught.

A User can make their Decoy Rule similar to their PCL Rule, with only a small difference between them that the User commits to memory, but an observer will not be aware of That way Users can have a "cheat sheet" to help them remember their PCL Rule without compromising its security.

Databases

In some preferred embodiments, the User Information database may consist of the following fields:

| | |
|---|---|
| User Id | A unique alphanumeric string identifying a User. |
| User Information | A set of data identifying a person, including their full name, address, etc. |
| Personal Combo Lock Rule (PCL Rule) | A sequence of calculations to be performed upon a set of input data. |
| Decoy Rule | A different sequence of calculations that produces a different result; using this Rule lets the system know that the person accessing the system is doing so illicitly. |
| Back Door Password | A static text string that acts like a "back door," allowing limited, emergency access to the system without knowing the PCL Rule. |
| Limited Access Passwords | A list of single-use, static text strings that allow limited, emergency access to the system without knowing the PCL Rule. |

The website—User Link database consists of the following fields:

| | |
|---|---|
| Client I.D. | A unique alphanumeric string identifying the client. |
| User I.D. | A set of data identifying a software client (usually a web server). |

Interactive Setup Wizard

Choosing, remembering and calculating a PLC Rule can be intimidating, especially to those who believe mathematics is difficult. The optional set up Wizard for first time visits may help a User choose a PLC Rule (making sure that it is not too simple (i.e., the first digit from each group)), then walks the User through remembering it (breaking it up into sections if necessary), and finally it may work the User through practice sessions until they are comfortable with their Rule. This process takes place while communicating directly with the system over a secure Internet connection. It can take place of the course of minutes, hours or days, until the User is comfortable with their PLC Rule and its use. With appropriate verification, Users can return to the Wizard at any point for refresher courses, or, of course, to change their PLC Rule. The Wizard may also recommend Decoy Rules (that diverge from the real Rule in only 1 or 2 small locations, so they will be easy to remember) and train the User to remember these as well.

The Wizard will also recommend setting up Limited Access Passwords or Back Door Passwords, and suggest schemes for such fixed passwords based on the answer to questions it asks the User.

Referring now to the drawings, lie reference numerals designate corresponding parts throughout the several views. These drawings both summarize and exemplify some preferred embodiments of the present invention.

Figure 1A:
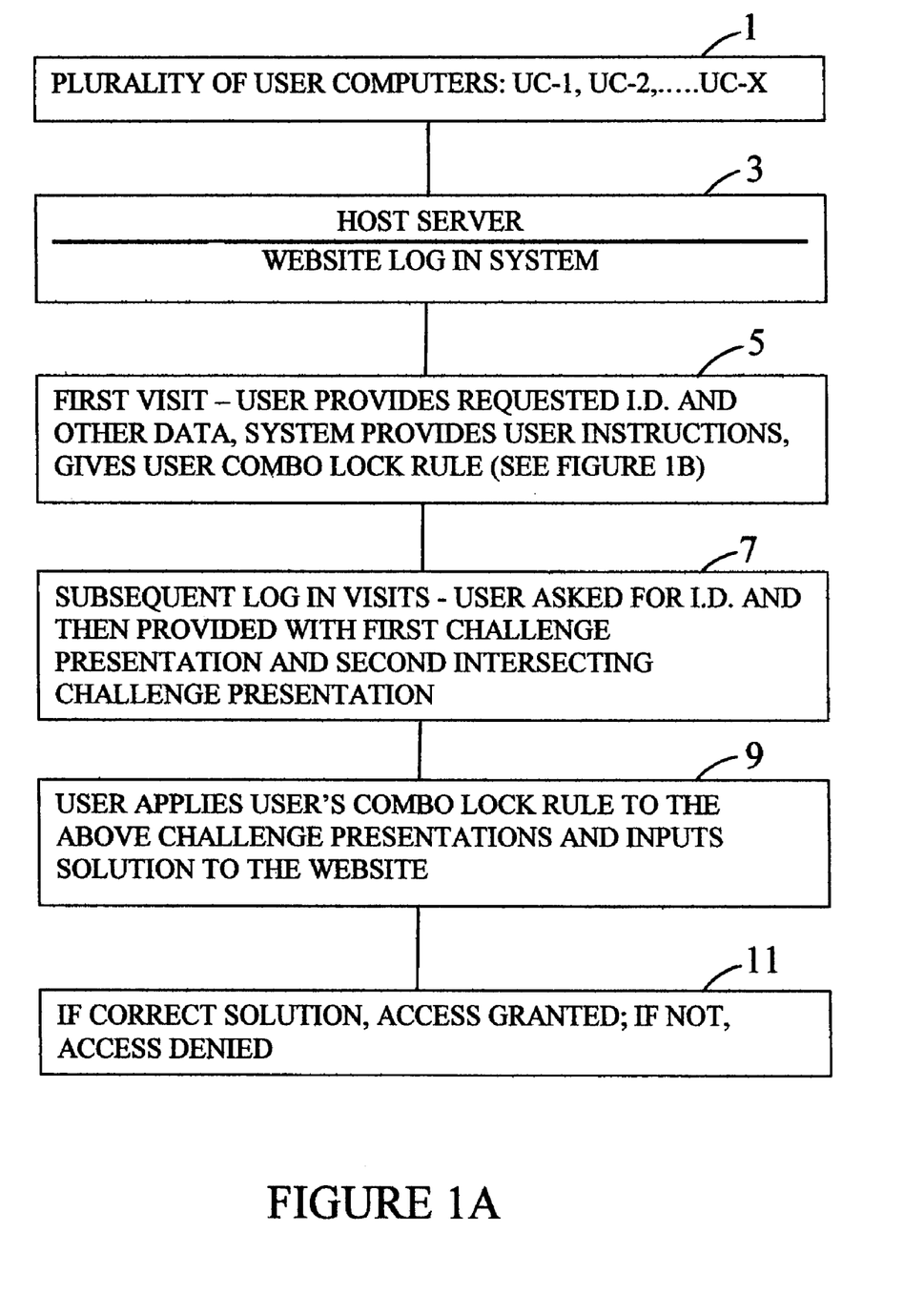
Figure 1B:
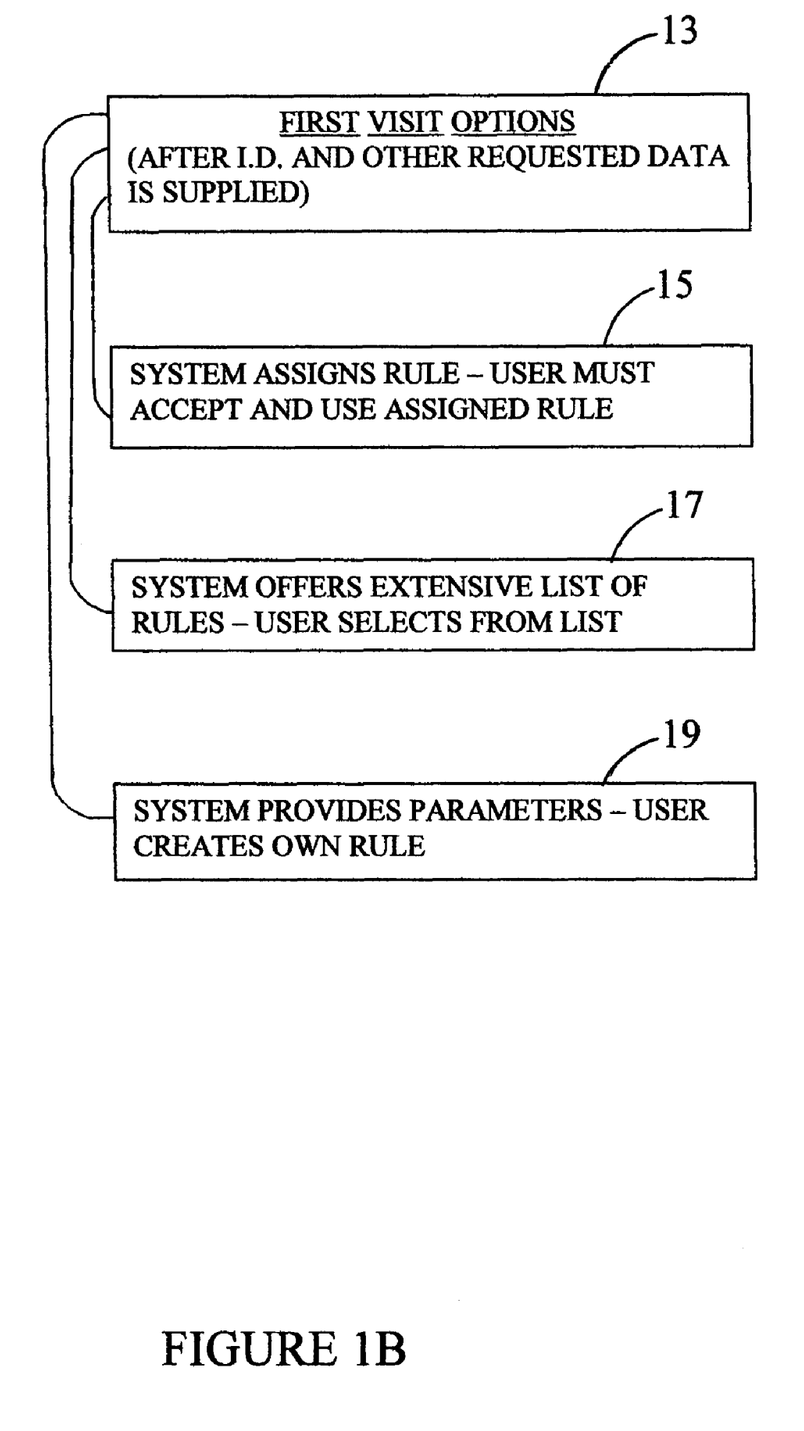

FIGS. 1 A and B illustrate a block diagram representation of a preferred embodiment of a log in system according to the present invention. In FIG. 1A, block 1 shows a plurality of User computers connected to host server (block 3) with the present invention website program. Upon a first visit (block 5), the User provides an I.D. and other optional data and a PLC Rule is assigned to the User (see FIG. 1B below for details).

Once the User has made the first visit to input an I.D. and other personal data and has been trained or provided with User instructions and has been provided with User's Combo Lock Rule, that Rule will not be given again by the system unless a new sign up or resign up procedure with clearance checks is indicated. Thus, on subsequent visits (block 7), the User is asked for the User I.D. and is then presented with the two intersecting challenge presentations to which the PLC Rule is applied (block 9). Examples above and below show the details of sample Rules and how they are applied. This is further exemplified by FIGS. 2 through 5 below.

FIG. 1B indicates the first visit options (block 13) that may be offered to a User (block 5, FIG. 1). In many present invention preferred embodiments, the system will automatically assign a PLC Rule. The assigned Rule may be randomly or logically selected from a stored collection by the program and the User will have no choice but to accept the use of the assigned Rule (block 15). Alternatively, or separately, the system may offer the User an extensive list of Rules and the User may select a Rule from that list (block 17). In yet another present invention embodiment, the system program may provide Rule parameters and the User may provide his or her own Rule (block 19). For example, the User may be told to select intersect sequences and may optionally have one one digit or two digit addition step for each intersection With this Rule a User might pick a Red box, third digit, add 6; Blue box, third digit, add 12. The system would accept this Rule, but given the parameter constraints, the User cannot create a Rule with red box, third digit, add 1,000 because adding 1,000 is not a two digit addition step.

Figure 2:
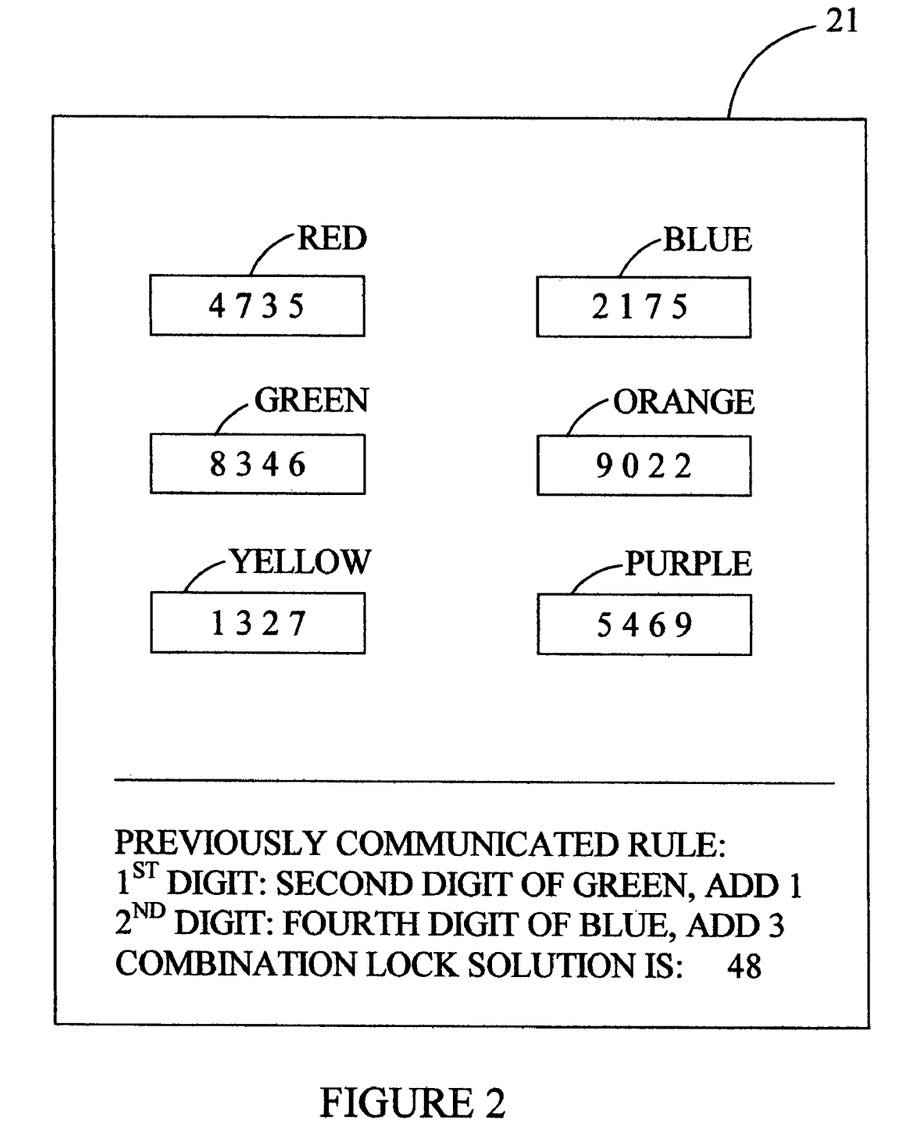
FIG. 2 is a front view of a screen representation of one step in the present invention system to show the intersecting challenge presentation and rule concepts.

FIG. 2 shows a screen 21 with a first challenge presentation, namely, six sets of four digits in each set, and a second challenge presentation that intersects with the first, namely, Red, Green, Yellow, Blue, Orange, Purple Boxes. Shown below the screen is a previously communicated Rule that the User would have from her first sign up session. The Rule involves the creation of two digits. The first solution digit is the second digit of the Green Box plus 1. The second solution digit is the fourth digit of the Blue Box plus 3. By looking at the screen 21 and finding the Green Box and the second digit therein "3" and adding 1, the first solution digit is 4. By looking at the Blue Box, the fourth digit is "5" and adding 3 yields 8. Therefore, the correct Combination Lock Solution is 48. If a User punches in 48, access will be granted. If no solution or the wrong solution is returned by the User, access is denied.

Figure 3:
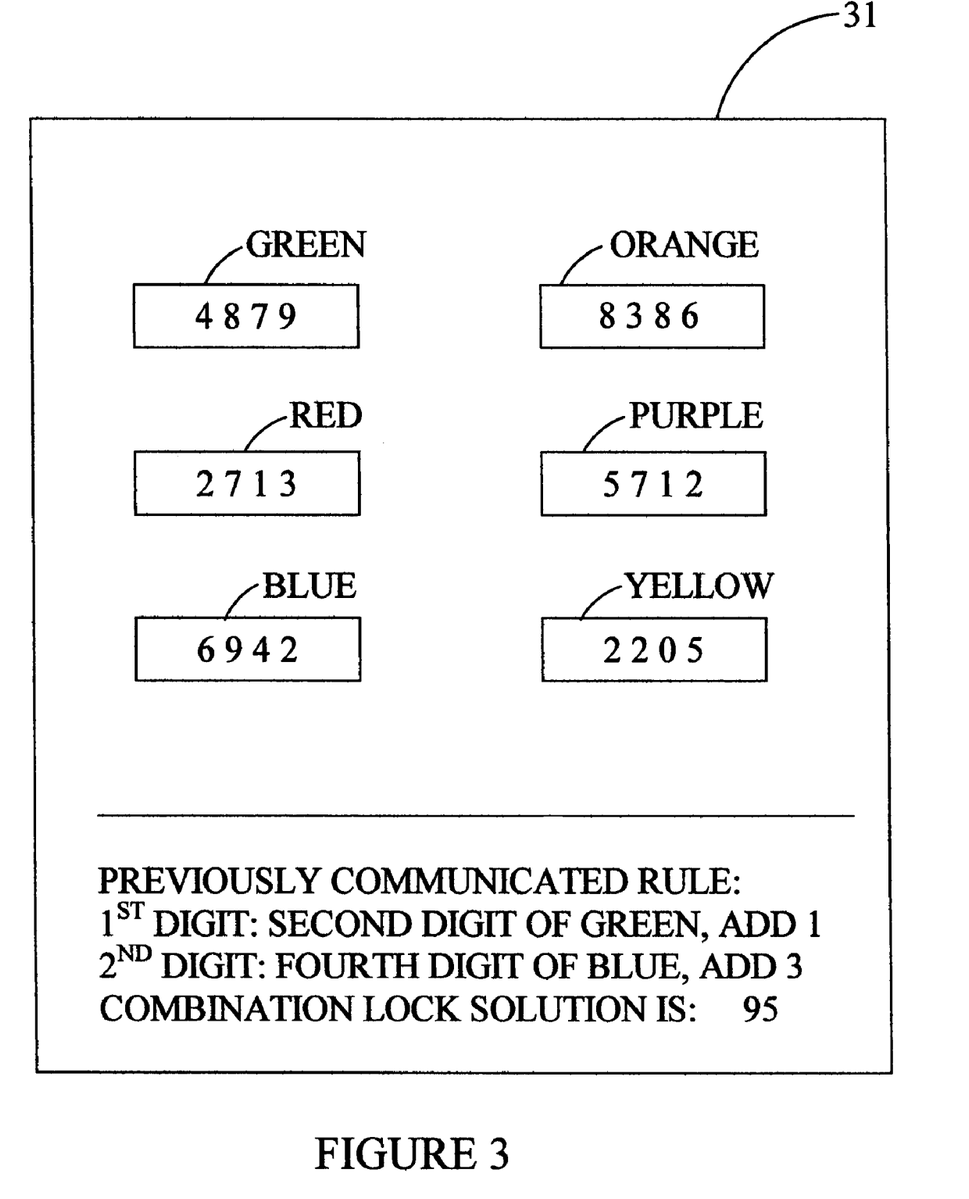
FIG. 3 is another front view of a screen representation of one step in the present invention system to show a changing intersecting challenge presentation and with the same rule as in FIG. 2.

The screen 21 of FIG. 2 may change every fifteen seconds for example, but the Users Rule would not change. FIG. 3 shows screen 31 with the same color boxes and six sets of four digits, as in FIG. 2, but the color positions have changed and the digits have changed when the User applies her Rule to this screen, the Combination Lock Solution is 95. In some embodiments, the screen may not change periodically but may be different each time that the homepage is opened. In either case, the critical challenge presentations are always different, the Rule is known only by the User and the solution changes. Thus, it is impossible or nearly impossible for a third party intruder to make any sense of what in transpiring or to use the current Combination Lock Solution for future access.

Figure 4:
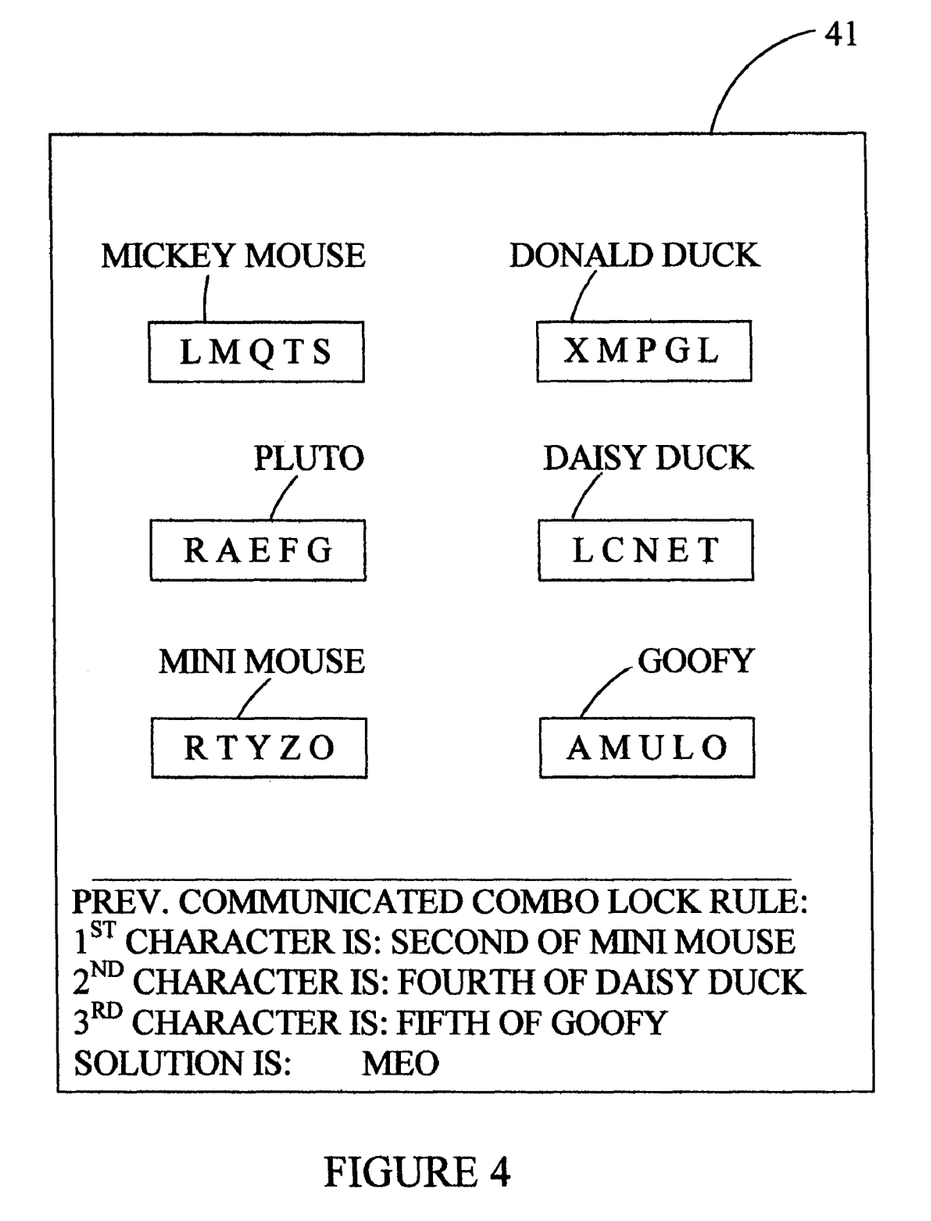
FIG. 4 is another front view of a screen representation of one step in the present invention system to show different intersecting challenge presentation and rule concepts; and, FIG. 5 is another front view of a screen representation of one step in the present invention system to show another example of intersecting challenge presentation and rule concepts.

FIG. 4 shows a screen 41 for a different present invention system wherein the first challenge presentation is made up of sets of five characters each. The second challenge presentation is shown schematically, but in reality may be outlines or highlighted picture presentations of Walt Disney characters such as Mickey Mouse and Donald Duck. The previously communicated PCL Rule is shown below the presentations and the solution for screen 41 is "MEO".

Figure 5:
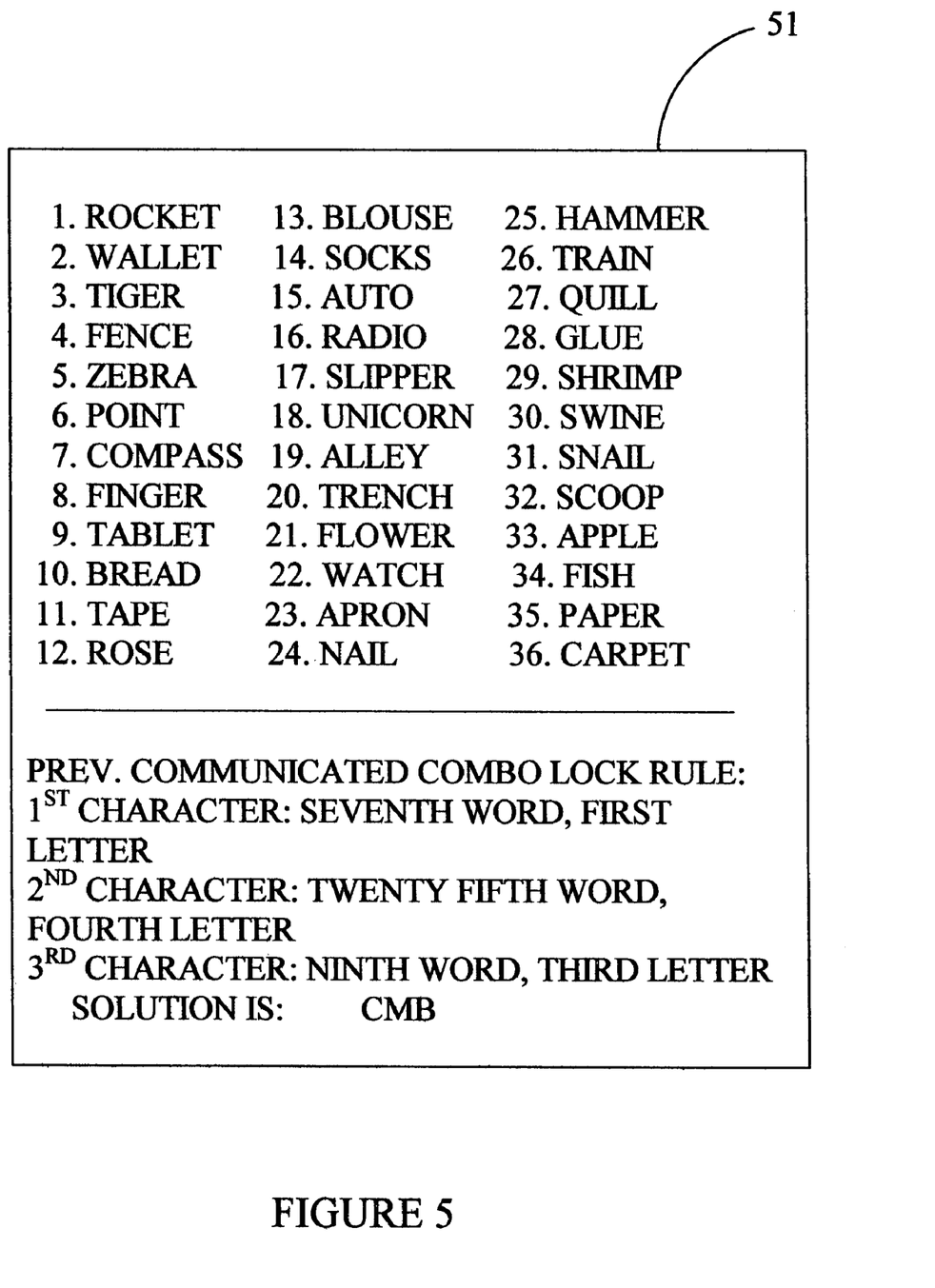

FIG. 5 shows yet a different present invention screen 51. The first challenge presentation is a collection of words (each word is a set and each letter of the word is a character of the set). The second challenge presentation is the position or number of each word. The PCL Rule is shown below the screen and its solution is "CMB" for this particular screen. If a User punches in "CMB" access will be granted. If no solution or the wrong solution is returned by the User, access is denied.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims. For example, in addition to direct access by keyboard, mouse, voice activation and voice recognition, the system may also be used in embodiments wherein telephone, text message, email or other access system is utilized.

What is claimed is:

1. A user friendly log-in system for validation of a user's identity for entry into a website, which comprises:
   (a) a plurality of user computers;

(b) an internet and an internet connection among said plurality of user computers;

(c) at least one host server connected to said internet and available for connection to said plurality of user computers;

(d) a website program for a website that requires individual user security, for secured control for connecting each of said plurality of computers to said website; and connection available to each of said plurality of user computers, including an open log-in field, said website program being hosted on said at least one host server, and said website program having means to provide log-in procedures, including software and hardware for:

(i) secured means for receiving and recognizing a unique user identification from a user of a user computer to create a personal combination lock rule for a unique user initialization input that includes a preset selection and operation of the intersection of a first randomly arranged challenge presentation and a second randomly arranged challenge presentation to obtain a selection solution wherein said personal combination lock rule is created on first visit of said user and said first randomly arranged challenge presentation and said second randomly arranged challenge presentation are presented to said user subsequent to creation of said combination lock rule and wherein said personal combination lock rule includes a plurality of positions wherein for each of said plurality of positions, there are at most three determinations whereby said user initialization input is easy to remember, and wherein said at least two determinations are selected from said first randomly arranged challenge presentation means and said second randomly arranged challenge presentation means whereby said log-in procedures are user-friendly;

(ii) said means for presenting a first randomly arranged challenge presentation including a plurality of sets of alphanumeric characters, each set having at least three said characters, wherein said plurality of sets are arranged in a predetermined pattern and said alphanumeric characters are randomly arranged with each set;

(iii) said means for presenting a second randomly arranged challenge presentation at least partially overlapping said first randomly arranged challenge presentation to create a plurality of intersections;

(iv) inclusion of a successful selection solution pertaining to said user's combination lock rule within said at least partial overlapping of said first randomly arranged challenge presentation and said second randomly arranged challenge presentation;

(v) means for responding to a user selection and operation solution input from a user computer when said user input is inputted into said open log-in field;

(vi) means for acknowledging said selection and operation solution input of said user and granting access to said website when said solution input is correct; and, (vii) means for denying access to said website when said user selection and operation solution input is incorrect.

2. The user friendly log-in system of claim 1 wherein said first randomly arranged challenge presentation is an array of sets of randomly arranged alphanumeric characters wherein said sets are arranged in rows and columns.

3. The user friendly log-in system of claim 1 wherein said second randomly arranged challenge presentation is a plurality of visual or audio presentations selected from the group consisting of colors, a numbered sequence, a lettered sequence, shapes, and combinations thereof.

4. The user friendly log-in system of claim 1 wherein when a user is granted access to said website, said website is presented in an arrangement to said user for one click access and said user's identification is forwarded to a checked website to open said website for said user's security thereof.

5. The user friendly log-in system of claim 1 wherein said website program further includes a program module to permit websites to subscribe to said program to link accessed user identification transfers to said websites and to bypass security log-in procedures for said websites when said users enter said websites.

6. The user friendly log-in system of claim 1 wherein said combination lock rule is given to said user during an initial set up session and is not presented by the host server at any subsequent log-in time.

7. The user friendly log-in system of claim 1 wherein said combination lock rule is to identify at least two alphanumeric characters based on at least two different combinations of at least one set from said first randomly arranged challenge presentation based on its intersection with said second randomly arranged challenge presentation, and then selection of at least one alphanumeric character from each selected set based on positions within said selected set to obtain a solution for solution input.

8. The user friendly log-in system of claim 1 wherein said combination lock rule is to identify at least two alphanumeric characters based on at least two different combinations of at least one set from said first randomly arranged challenge presentation based on its intersection with said second randomly arranged challenge presentation, and then selection of at least one alphanumeric character from each selected set based on positions within said selected set to obtain a first solution for said solution input and subsequently operate on at least one character of said first solution by mathematical manipulation selected from addition and subtraction.

9. The user friendly log-in system of claim 1 wherein said second randomly arranged challenge presentation is a set of different colors, one each corresponding to each of said sets in said first randomly arranged challenge presentation.

10. The user friendly log-in system of claim 9 wherein said colors are presented on a screen as color backgrounds highlighting each alphanumeric set.

11. The user friendly log-in system of claim 1 wherein said website program includes voice recognition features wherein a user may proceed through a log-in by audio inputs.

12. The user friendly log-in system of claim 11 wherein said website program further includes speak back features so that both inputs and outputs are audio.

13. The user friendly log-in system of claim 12 wherein said colors are spoken colors preceding spoken sets of alphanumeric characters.

14. The user friendly log-in system of claim 1 wherein said first and second randomly arranged challenge presentations may be different each time a website is opened.

15. The user friendly log-in system of claim 14 wherein said first and second randomly arranged challenge presentations change on an open website after a predetermined time period has elapsed.

16. The user friendly log-in system of claim 1 wherein said website program further includes presentation of a plurality of different choices of combination lock rules and each new user is afforded the opportunity to select a combination lock rule.

17. The user friendly log-in system of claim 1 wherein said website program includes presentation of one combination lock rule to each new user.

18. The user friendly log-in system of claim 17 wherein said master security website program stores a significant plurality of different combination lock rules and randomly assigns one to each new user.

19. The user friendly log-in system of claim 1 wherein said website program is a subprogram module of said website and may be programmable to permit a web programmer to customize said second randomly arranged challenge presentation.

20. The user friendly log-in system of claim 1 wherein said website program has open fields for said second randomly arranged presentation and a website programmer is provided with a choice of second randomly arranged presentation symbols.

21. The user friendly log-in system of claim 1 wherein said alphanumeric characters include symbols of foreign languages.

22. The user friendly log-in system of claim 1 wherein said system further includes a second combination lock rule that is a decoy rule that utilizes a different selection operation to obtain a different solution to which access is denied.

23. The user friendly log-in system of claim 1 wherein said system further includes a back door password that allows only a single use access without revealing said personal combination lock rule.

24. The user friendly log-in system of claim 1 wherein said system further includes a limited access password that allows third party access on a limited basis without revealing said personal combination lock role.

* * * * *